INVENTOR
PHILIP LITTLE, JR.
ATTORNEYS

Patented Dec. 2, 1924.

1,517,788

UNITED STATES PATENT OFFICE.

PHILIP LITTLE, JR., OF MINNEAPOLIS, MINNESOTA, ASSIGNOR TO THE STRONG-SCOTT MANUFACTURING COMPANY, OF MINNEAPOLIS, MINNESOTA, A CORPORATION OF MINNESOTA.

GRAIN DRYING AND COOLING APPARATUS.

Original application filed September 26, 1921, Serial No. 503,208. Divided and this application filed March 27, 1924. Serial No. 702,333.

*To all whom it may concern:*

Be it known that I, PHILIP LITTLE, Jr., a resident of Minneapolis, in the county of Hennepin and State of Minnesota, have invented certain new and useful Improvements in Grain Drying and Cooling Apparatus, of which the following is a specification.

This invention relates to improvements in apparatus for drying and cooling grain, and the objects I have in view are to provide means for drying and cooling grain and simultaneously removing the dust therefrom and depositing the same in a suitable dust collector or collectors.

The invention consists generally in means for removing the dust from a body of grain while it is flowing through a drier, or a cooler, or a combined drier and cooler, and depositing the same in a suitable dust collector or collectors.

The invention consists further in the constructions and combinations hereinafter described and particularly pointed out in the claims.

In the accompanying drawings forming part of this specification,

Figure 1:
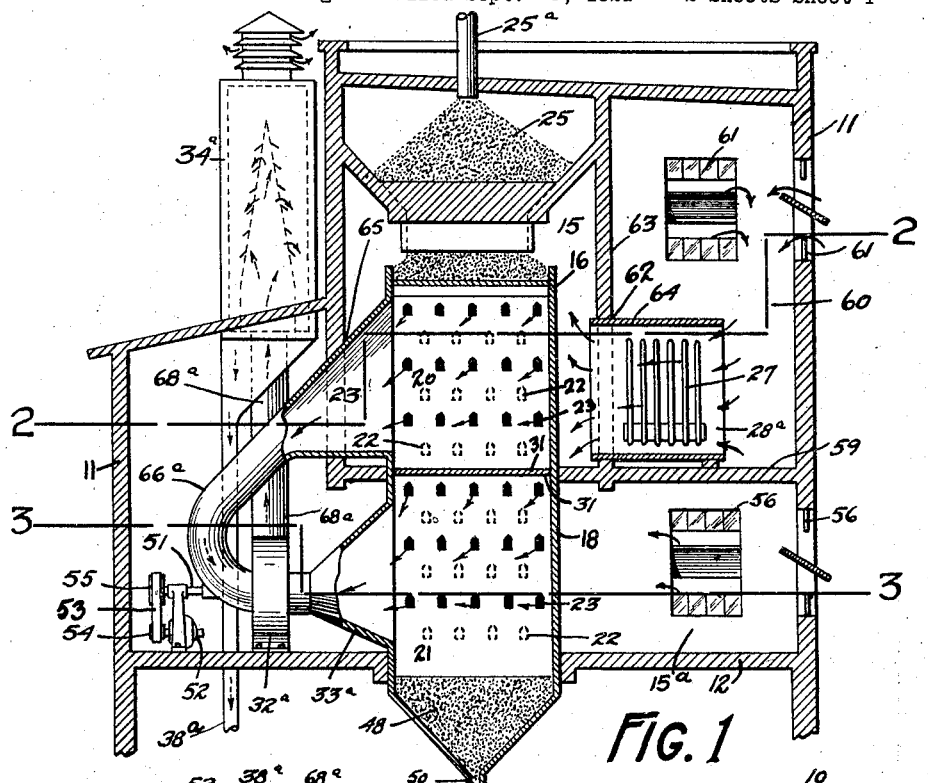
Figure 1 is a transverse vertical section of an apparatus embodying my invention, the section being taken on line 1—1 of Figure 2.

The present application is a division of my application for patent on grain drying apparatus filed September 26, 1921, Serial No. 503,208, which has matured into Letters Patent No. 1,496,473, dated June 3rd, 1924.

In the drawings 10, 10, represents the side walls, 11, 11 the end walls, and 12 the floor of a preferable form of building or structure. The space enclosed by these walls is preferably divided into upper chambers 15 and 60 and a lower chamber $15^a$.

With this arrangement there will be, as shown in Figures 2, 3, 5 and 6, a free space within the chambers 15 and $15^a$ surrounding the heating and cooling sections of the casing.

I preferably provide, extending across the passages 19, a series of ducts 22 and 23, composed of perforated or screened material, open at one end and closed at the other, the open ends of the duct 22 being in communication, through the outer walls of the casing, with the rooms 15 and $15^a$, and the open ends of the ducts 23 being in communication, through openings in the walls 24, with the air chambers 20 and 21.

Figure 2:
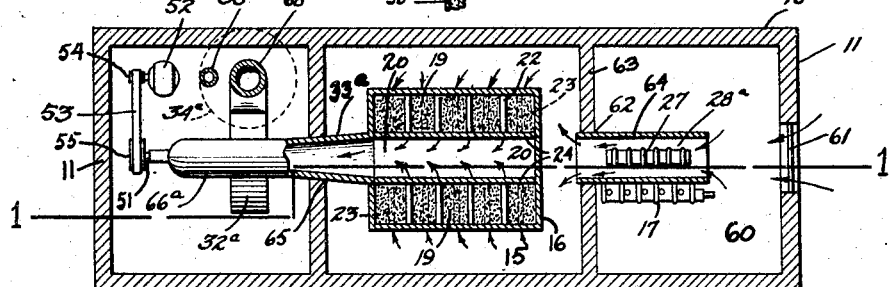
Figure 2 is a horizontal section on line 2—2 of Figure 1.
Figure 3:
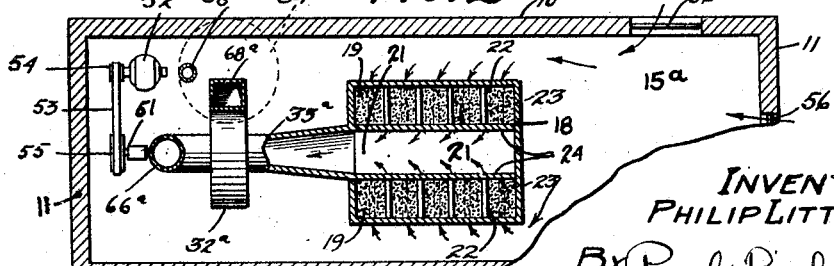
Figure 3 is a horizontal section, partly broken away, on line 3—3 of Figure 1.

I have shown in Figures 1, 2 and 3 of the drawings, a fan $32^a$ arranged to be driven by any suitable means as through a motor 52, belt 53, motor pulley 54, fan pulley 55 and fan shaft 51. The fan is shown having pipe connections $33^a$ and $66^a$ with the cooler and drying chambers 21 and 20 respectively. By the operation of this fan it will be seen that air is drawn from the chamber 15 through the ducts 22; from these ducts through the body of the grain into the ducts 23, and through the open ends of the duct 23 into the chamber 20. Similarly air is drawn from the chamber $15^a$ through the ducts 22; from these ducts through the body of the grain in the ducts 23, and into the chamber 21. These air currents collect the dust from the passing body of grain and carry it to the fan, from whence it may be discharged through a suitable trunk $68^a$, into a dust collector $34^a$ having a discharge spout $38^a$ (Figure 1).

It will be seen that with this arrangement air is drawn through the body of grain descending through each of the passages 19, said air passing from the room 15 into the chamber 20, and thence through the pipe $66^a$ to the fan $32^a$, or from the room $15^a$ through the grain into the chamber 21, and thence through the connection $33^a$ to the fan $32^a$.

By this means the dust contained in the body of grain will be drawn into the inner chamber 20 or 21, and thus removed from the grain to be thereafter blown into the dust collector 34ª through the pipe 68ª, from which dust collector it is discharged through the pipe 38ª.

I prefer to heat the air that passes from the room 15 through the grain to the chamber 20, thereby heating the grain sufficiently to completely remove any moisture therefrom. For heating the air which passes through the drier I have shown a transverse partition or wall 63 arranged to form a separate room or compartment 60 (Figures 1, 2, 4 and 5), with an opening 62 arranged in the wall 63, and a trunk 64 arranged in this opening, and with suitable heating coils 27 arranged in said trunk. The base provided with valves for the heating coils is shown at 17 outside of the trunk 64. Any suitable means may be provided for heating the air passing through the trunk 64.

The walls of the compartment 60 are provided with suitable windows 61 so that air may be drawn from outside of the building through these windows, and, through the trunk 64, past the heating coils 27. This heated air may then be circulated, in the manner described, through the descending grain to the fan, carrying the dust from the grain with it into said fan, and from said fan into the dust collector.

As the air drawn through the lower part of the casing, constituting the cooler, is preferably cool air drawn from the outside of the building, this air may pass directly into the chamber 15ª, and thence, in the manner described through the descending grain into the chamber 21. From this chamber the air, and the dust taken out of the grain with it, will be carried, through the connection 33ª, to the fan 32ª, to be blown with the dust laden air taken out of the heating section of the device to the dust collector.

Figure 4:
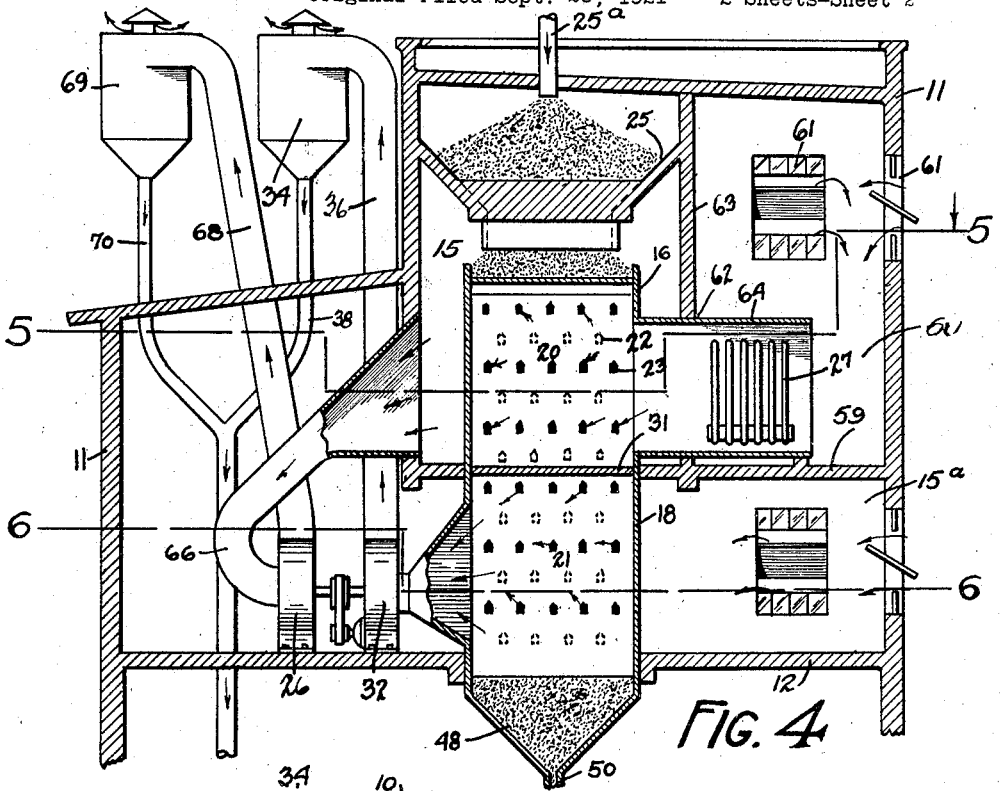
Figure 4 is a view similar to Figure 1, the section being taken on line 4—4 of Figure 5, showing slightly modified construction.
Figure 5:
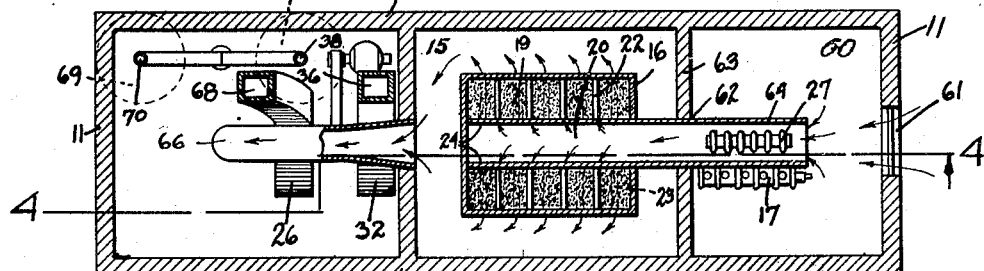
Figure 5 is a section on line 5—5 of Figure 4.
Figure 6:
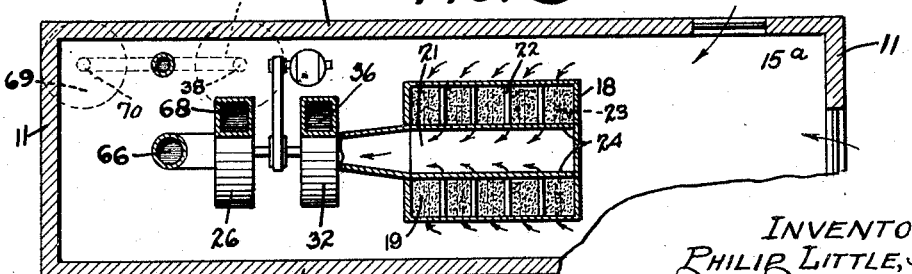
Figure 6 is a section, partly broken away, on line 6—6 of Figure 4.

I may also provide a separate fan as shown in Figure 4 for each section of the drier and cooler. As here shown I have provided a fan 32 to draw the air through the cooling section of the casing, and I have provided a separate fan 26 to draw the air through the drying section of the casing.

As here shown, the arrangement in connection with the cooler is the same as that shown in Figures 1, 2 and 3 of the drawings, and the dust laden air is blown from the fan 32 to the dust collector 34, through the pipe 36, and from this dust collector, here shown as of the cyclone type, the dust passes through an outlet pipe 38.

I have, however, in this instance shown the trunk 64 in which the heating coil 27 is located connected directly to the chamber 20, within the drier (Figures 4 and 5), while the connection 66, extending to the fan 26, is connected to the wall of the chamber. A pipe 68 extends from the fan 26 to a dust collector 69, which is preferably connected through a pipe 70 to the discharge pipe 38 from the other dust collector.

With this arrangement the heated air passes to the interior of the chamber 20. It passes outward through the ducts 23 and then through the body of the grain to the ducts 22, which open into the chamber 15, from which the dust laden air is taken out by the fan through the conductor 66.

I also prefer to provide the compartment 60 of the chamber 15, and the chamber 15ª with suitable openings in their walls, provided with windows and shutters 61 and 56, which may be opened more or less so as to regulate the inflow of air from the outside. By this means the air currents through the air chambers, and through the grain, may be regulated as desired.

I may provide both fans on a single fan shaft 51, having a belt pulley 55, and said pulley may be rotated by means of a belt 53 from a driving motor 52 having a motor pulley 54.

I have shown in Figure 1, means whereby the air may first pass into the room 15 surrounding the grain drier, and then through the ducts extending transversely of the grain passages, and then to the interior air chamber 20, while in Figure 4 I have shown means for conducting the heated air first to the interior of the chamber 20, and thence outwardly, across the grain passage, into the drying chamber 15, and thence to the fan. I may employ either of these constructions. I have shown in the present drawings, in both illustrations, the cool air entering the chamber 15ª and passing from this room through the ducts across the grain passages to the interior of the chamber 21 and thence to the fan. I may, however, by connecting the air inlet to the interior of the chamber 21, and making the fan connection extend from the room 15ª to the fan, cause the air currents to pass in the opposite direction in connection with the cooler, substantially as illustrated in the drawings of my application No. 503,208, above referred to, of which this is a division.

I do not limit myself to the details of the construction herein shown and described as the same may be varied in many particulars without departing from my invention.

I claim as my invention:

1. The combination, in an apparatus of the class described, with drying and cooling rooms, and a grain drier and cooler mounted therein, and having upper and lower air chambers, and vertical grain passages arranged between said chambers and said rooms, of means for circulating air through said rooms and chambers, and transversely through the grain in said grain passages, whereby dust will be removed from the passing grain, and means for conducting the dust-laden air to dust-collecting means.

2. The combination, in an apparatus of the class described, with a drying room and a grain drier therein, and having an interior air chamber and vertical grain passages arranged between said air chamber and said room, of means for circulating air through said room and air chamber, and transversely through the grain in said grain passages, whereby dust will be removed from the passing grain, and means for conducting the dust-laden air to dust-collecting means.

3. The combination, in an apparatus of the class described, with a drying room and a grain drier mounted therein, and having an interior air chamber and vertical grain passages arranged between said chamber and said room, of means for circulating air through said room, and transversely through the grain, in said grain passage, into said air chamber, whereby dust will be removed from the passing grain, and means for conducting the dust-laden air from said air chamber to dust-collecting means.

4. The combination, in an apparatus of the class described, with a drying room and a grain drier mounted therein, and having an interior air chamber and vertical grain passages arranged between said air chamber and said room, of means for circulating heated air through said room and air chamber, and transversely through the grain in said grain passages, whereby the passing grain will be dried and dust will be removed therefrom, and means for conducting the dust-laden air to dust-collecting means.

5. The combination, in an apparatus of the class described, with drying and cooling rooms, and a grain drier and cooler mounted therein, and having upper and lower air chambers and vertical grain passages arranged between said chambers and said rooms, of means for circulating heated air through the drying room, and the corresponding air chamber, and transversely through the grain in the grain passages between said room and said chamber, and means for circulating cool air through the cooling room, and the corresponding air chamber and through the grain in the grain passages between said room and chamber, whereby the grain will first be dried and dust removed therefrom and will afterwards be cooled and additional dust removed therefrom as the grain moves through said grain passages, and means for conducting the dust-laden air to dust-collecting means.

6. An apparatus of the class described having drying and cooling rooms, a grain drier and cooler mounted therein provided with grain passages, upper and lower air chambers, and groups of ducts or openings arranged in said grain passages and communicating respectively with said rooms and said air chambers, and means for passing heated air through said drying room and cooling air through said cooling room.

7. An apparatus of the class described having drying and cooling rooms and a grain drier and cooler mounted therein provided with vertical grain passages, and upper and lower air chambers, in combination with a fan and a dust collector, and means co-operating with said fan for passing heated air through said drier, and thereafter conducting said air to said dust collector.

8. An apparatus of the class described comprising a grain drier and cooler provided with vertical grain passages and air chambers, in combination with a fan and dust collector, and means cooperating with said fan for passing cooling air through said cooler and thereafter conducting said air to said dust collector.

9. In an apparatus of the class described including a grain drier and cooler having grain passages and enclosed air chambers, in combination with a collector, means for passing heated air through said drier and to said collector, and means for passing cooling air through said cooler and to said collector.

10. An apparatus of the class described, comprising a grain drier and cooler having grain passages and air chambers, means for passing currents of heated air through said drier and currents of cool air through said cooler, and removing and preventing the accumulation of dust in said drier and said cooler.

11. In a grain drier and cooler and in combination with means for passing heated air through the drier and means for passing cooling air through the cooler, of a dust collector and means for conducting the air that has passed through the drier and the air that has passed through the cooler to said dust collector.

In witness whereof, I have hereunto set my hand this 9th day of February, 1924.

PHILIP LITTLE, Jr.